United States Patent [19]

Moore et al.

[11] Patent Number: 5,421,633
[45] Date of Patent: Jun. 6, 1995

[54] INTEGRATED UTILITY/CAMPER SHELL FOR A PICK-UP TRUCK

[75] Inventors: Thomas S. Moore, Northville; Gilbert B. Chapman, II, Southfield; Delbert D. DeRees, St. Romeo; Subimal Dinda, Bloomfield Hills; Donald E. Jay, Troy; David J. Kowall, Hartland; Lawrence M. Lalik, Troy; Kenneth S. Mack, Bloomfield Hills; K. Neil Walling, Leonard, all of Mich.

[73] Assignee: Chrysler Corporation, Highland Park, Mich.

[21] Appl. No.: 295,187

[22] Filed: Aug. 24, 1994

Related U.S. Application Data

[63] Continuation of Ser. No. 79,032, Jun. 21, 1993, abandoned.

[51] Int. Cl.6 .............................................. B60P 3/34
[52] U.S. Cl. .................................... 296/165; 296/204; 296/29; 296/901; 16/231; 16/258; 16/261
[58] Field of Search ............... 296/100, 164, 165, 183, 296/901, 203, 204, 203, 29; 16/231, 232, 258, 261, 267, 270

[56] References Cited

U.S. PATENT DOCUMENTS

| 2,478,993 | 8/1949 | Wing ................................. 296/29 X |
| 2,718,288 | 9/1955 | Boyer ............................. 296/204 X |
| 4,262,961 | 4/1981 | Schmidt ......................... 296/204 X |

FOREIGN PATENT DOCUMENTS

| 1441485 | 5/1966 | France ................................ 296/183 |
| 7710196 | 3/1979 | Netherlands ....................... 296/164 |

Primary Examiner—Dennis H. Pedder
Attorney, Agent, or Firm—Christopher Taravella

[57] ABSTRACT

There is disclosed herein a utility/camper multiple purpose shell integrated with a pick-up truck frame and cab. The shell is adaptable (1) to being fully opened at the rear, (2) to having the roof thereof pivotally raised to permit standing room for a user, (3) to having flexible walls attached to the raised roof suitable for camping therein, and (4) to having the roof thereof lifted off of the front and side walls. The shell components are formed of light weight materials and bonded together.

6 Claims, 14 Drawing Sheets

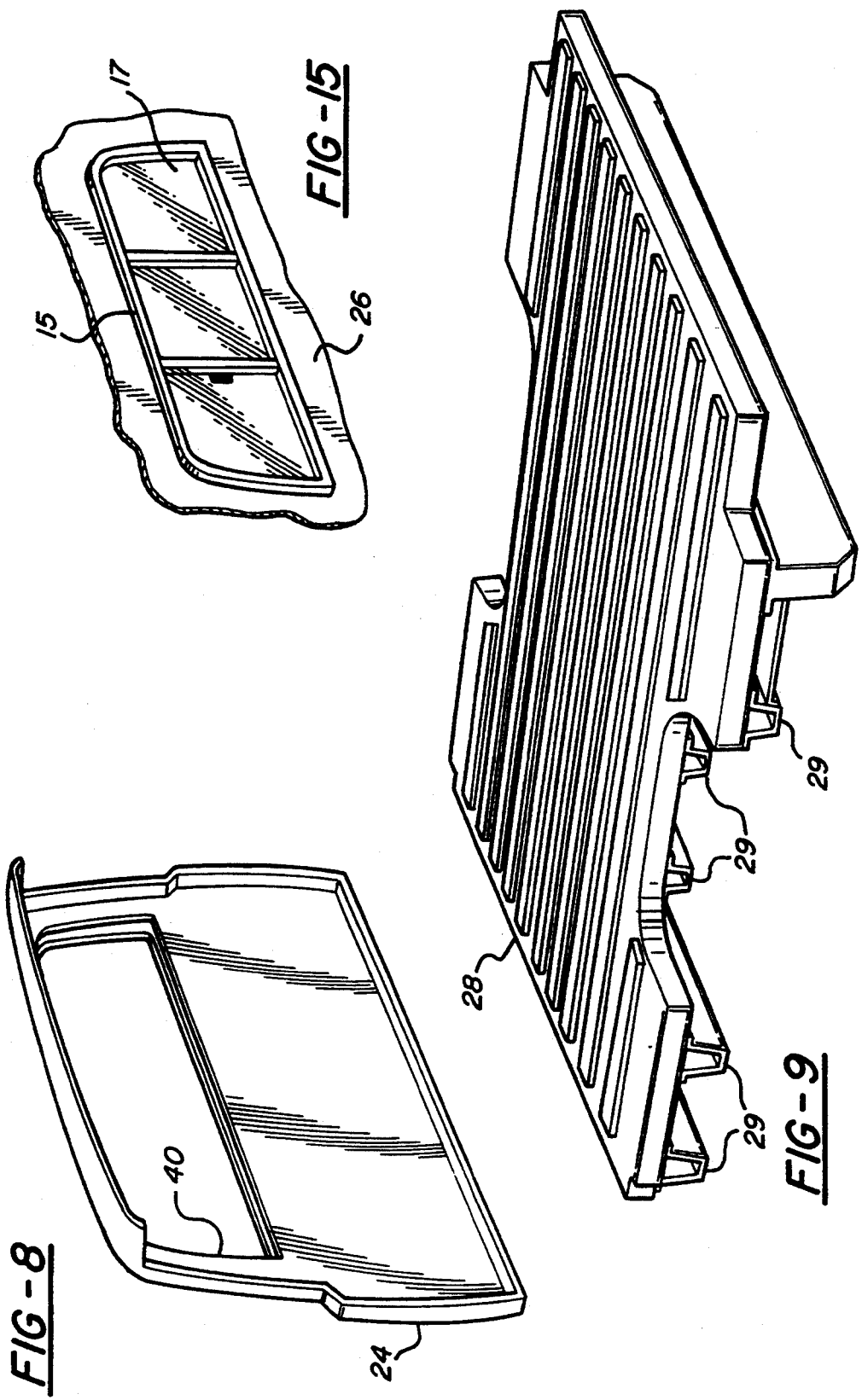

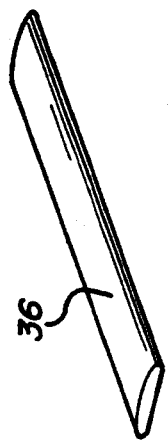
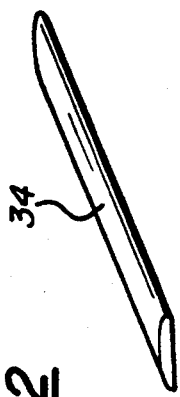
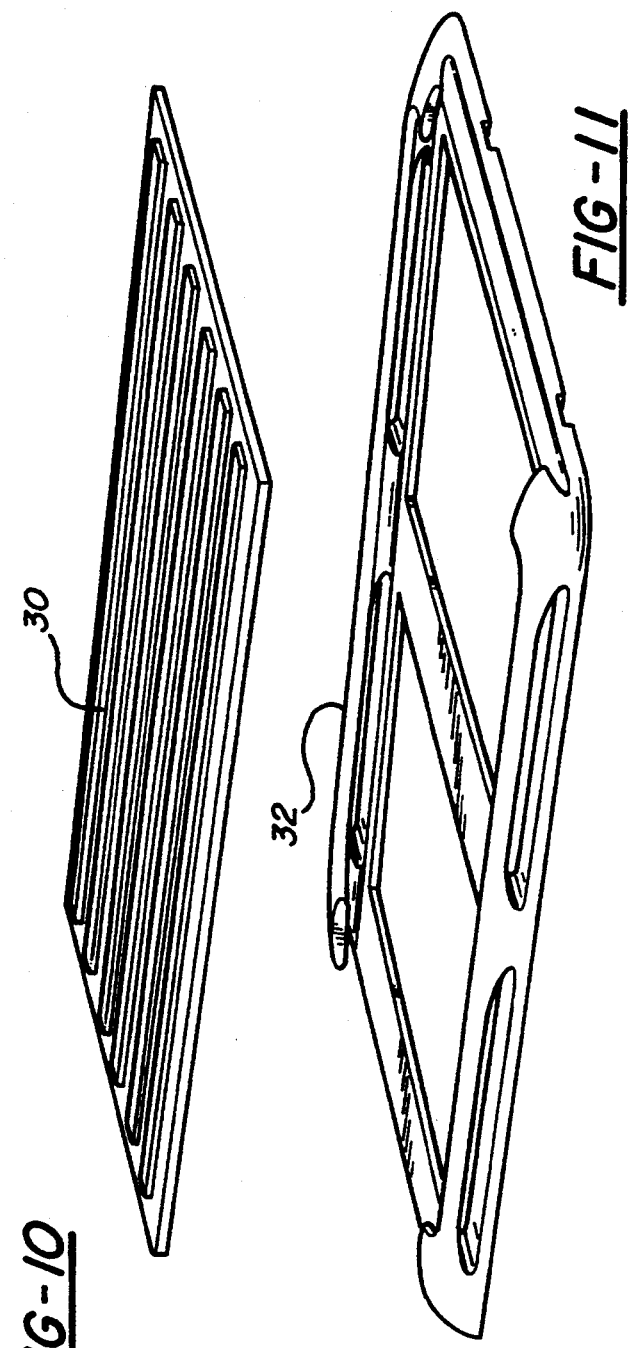

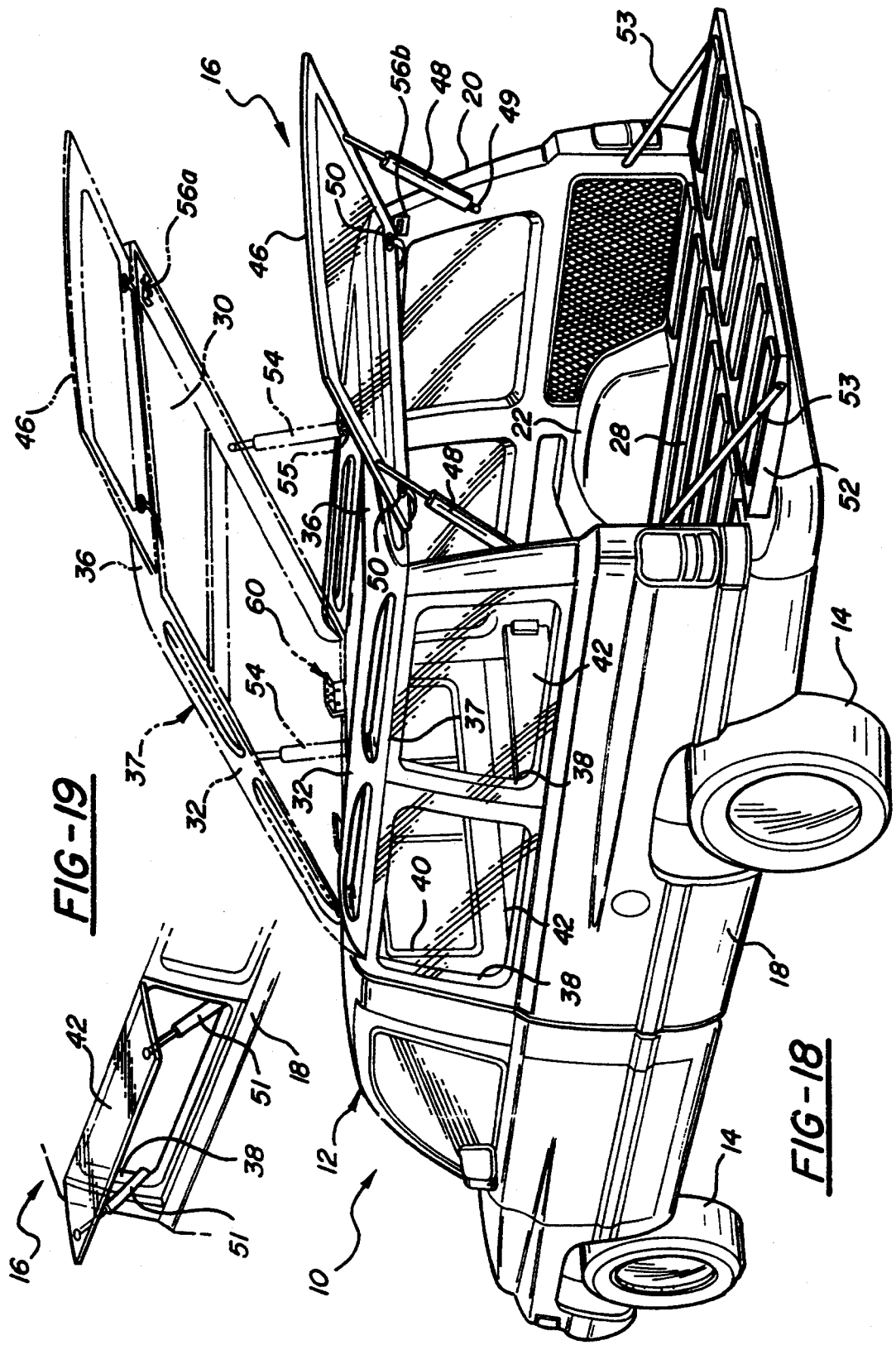

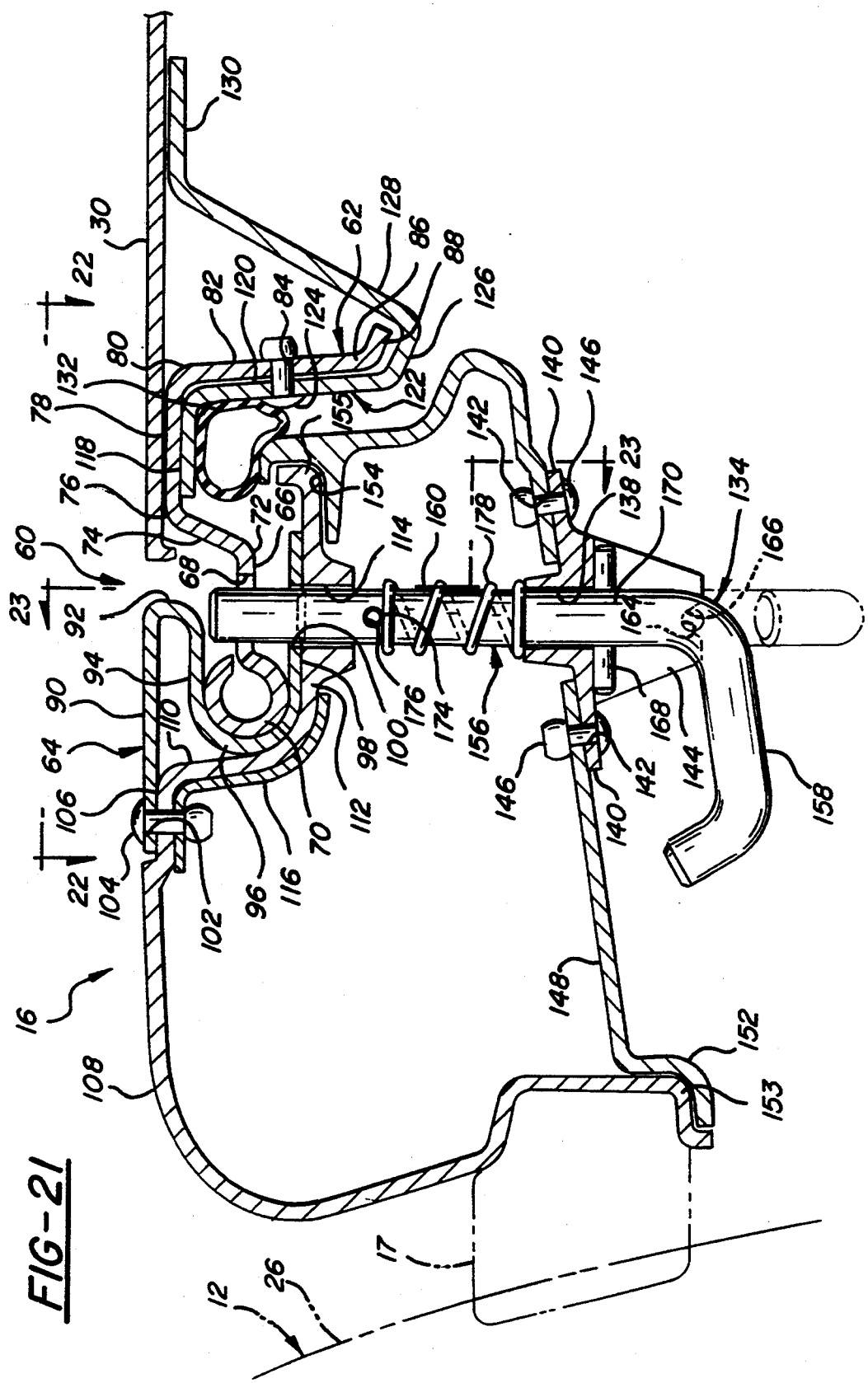

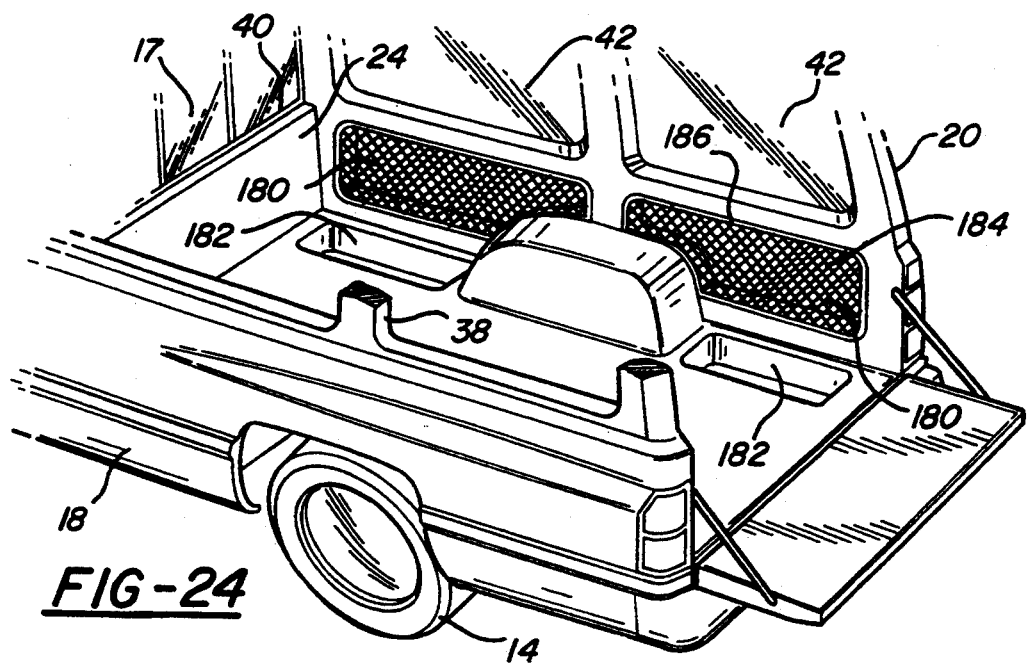
FIG-24
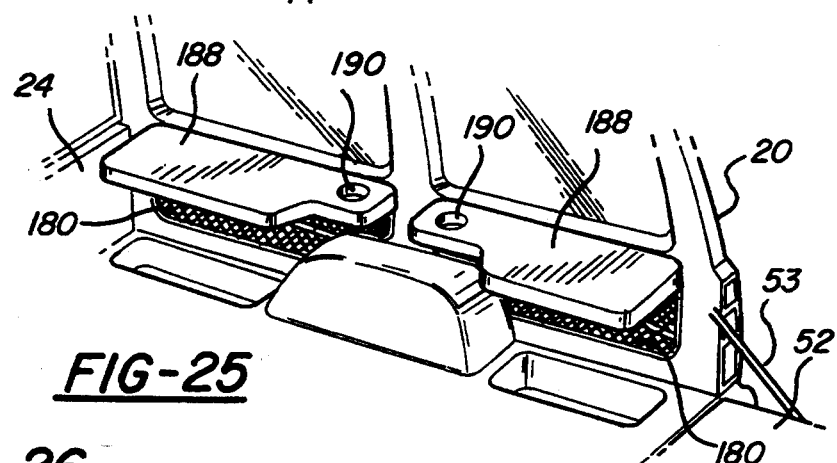
FIG-25
FIG-26
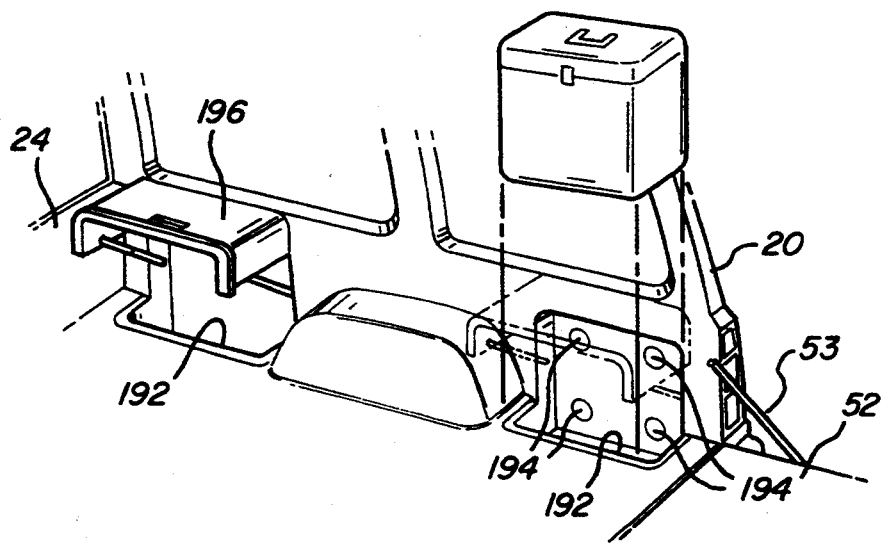

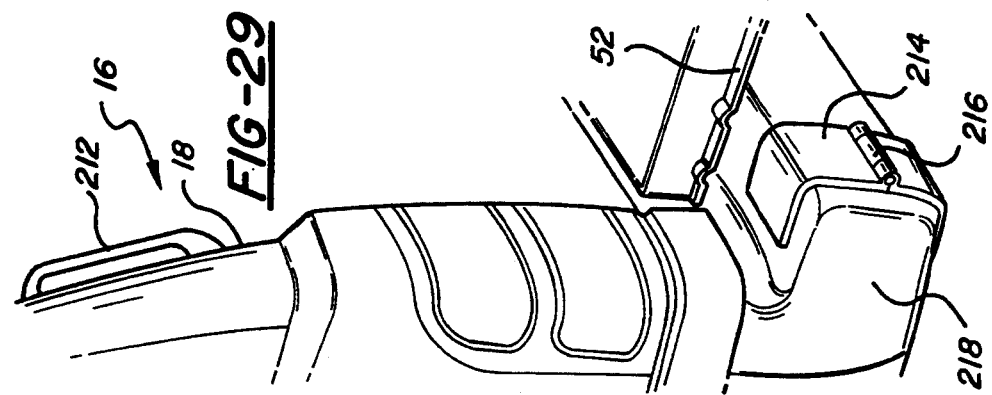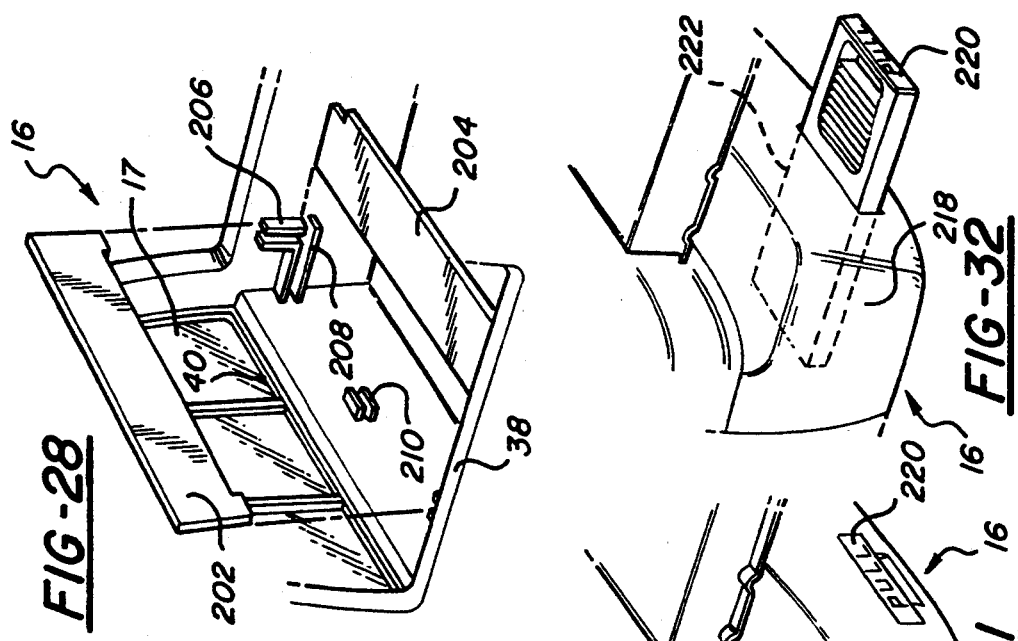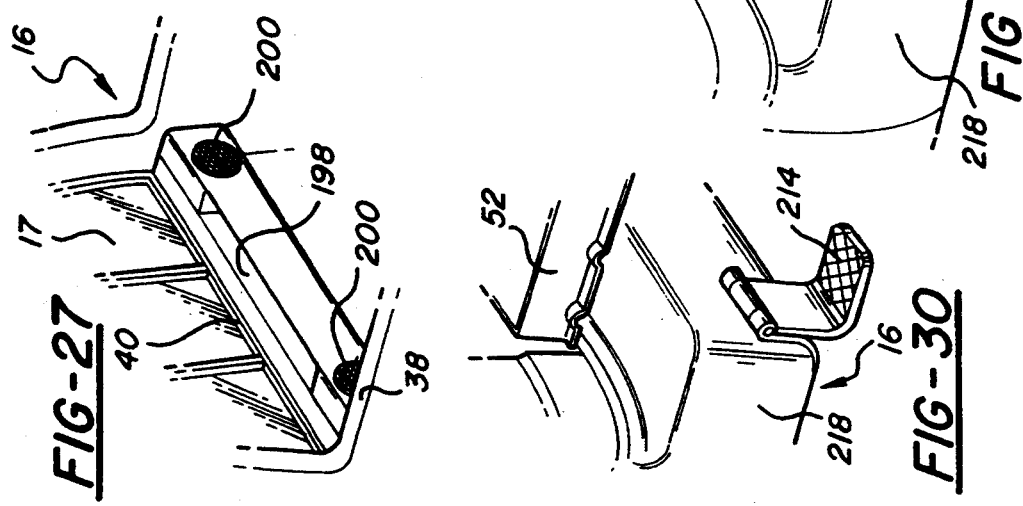

INTEGRATED UTILITY/CAMPER SHELL FOR A PICK-UP TRUCK

This is a continuation of application Ser. No. 08/079,032, filed on Jun. 21, 1993, now abandoned.

TECHNICAL FIELD

This invention relates generally to recreational vehicles and, more particularly, to an integrated utility/camper shell for a pick-up truck.

BACKGROUND ART

Robbins U.S. Pat. No. 3,857,601 discloses a canopy secured to a pick-up truck and composed of optically transparent plastic top side, rear and front walls.

Robertson U.S. Pat. No. 4,083,596 discloses a substantially flat cover member pivotally connected at its leading edge to the walls of the bed of a pick-up truck.

Koehn U.S. Pat. No. 4,101,162 discloses an inverted U-shaped box-type camper shell vertically swingably mounted at its forward end on the bed of a pick-up truck.

Mashigan U.S. Pat. No. 4,123,099 discloses a removably mounted rear bed closure for a truck, including rear doors for movement between open and closed positions about vertical axes.

Wilson et al U.S. Pat. No. 4,324,429 discloses a cover pivotally attached at its leading end to the front of a pick-up bed by a detachable hinge.

Pettit et al U.S. Pat. No. 4,671,560 discloses an inflatable window boot for joining in sealing relationship the aligned window openings in a cab/camper combination.

Gutgsell U.S. Pat. No. 4,335,916 discloses a molded plastic cap or "topper" for a pick-up truck, including a section of the upper horizontal surface hingedly connected to a predetermined forward portion of that surface.

Lake U.S. Pat. No. 4,756,571 discloses an inverted U-shaped lift-roof cover pivotally attached at the lower edge of the forward wall thereof to the bed of a light truck.

Muirhead U.S. Pat. No. 4,828,315 discloses a pick-up truck cargo canopy assembly divided into a permanently mounted front section and a rear section attached by clamps to the front section and the truck bed sidewalls.

Swann U.S. Pat. No. 4,932,717 discloses a pick-up truck bed cap including integral side panels, a partially covering upper panel, and rear edge panels, with an articulated door including an upper section pivotally attached to a mid-portion of the partially covering upper panel, and a rear section pivotally connected to the upper door section between the rear edge panels.

Johnson et al U.S. Pat. No. 4,998,769 discloses a cargo box mounted on the vehicle chassis frame and having side panels formed of a relatively flexible material.

Lake U.S. Pat. No. 5,102,185 discloses an inverted U-shaped lift-roof cover pivotally attached at the upper edge of the forward wall thereof to the bed of a light truck.

Enninga U.S. Pat. No. 5,104,175 discloses an openable U-shaped cover for a pick-up truck that, as a complete unit is rotatably operable about an internally mounted, pivot means disposed adjacent the inside top, forward end of the cover.

Miller U.S. Pat. No. 5,127,701 discloses a shell for the bed of a pick-up truck, including a base member having partial sides and top portions, and a top member having a top and sides hinged to the base member, with a quick release feature.

DISCLOSURE OF THE INVENTION

A general object of the invention is to provide an improved integrated utility/camper multi-purpose shell for a pick-up truck.

Another object of the invention is to provide a utility/camper shell having a composite rust-free body and dent resistant outer body formed of a suitable fiber reinforced plastic.

A further object of the invention is to provide a utility/camper shell having a lightweight "two position" or "lift-off" roof.

Still another object of the invention is to provide a utility/camper shell having substantially an equivalent pay load in comparison with a conventional pick-up truck box alone on the same frame and cab.

A still further object of the invention is to provide an integrated sub-assembly utility/camper shell which is adapted to assembly line installation on the frame of a pick-up truck and which is adaptable (1) to being fully opened at the rear, (2) to having the roof thereof pivotally raised to permit standing room for a user, (3) to having flexible walls attached to the raised roof suitable for camping or occupying therein, and (4) to having the roof thereof lifted off of the front and side walls.

These and other object and advantages will become more apparent when reference is made to the following drawings and the accompanying description.

BRIEF DESCRIPTION OF THE DRAWINGS

FIG. 5-16 are perspective views of the respective components of FIG. 4;

FIG. 18 is a perspective view similar to FIG. 1 illustrating two operational features of the invention;

FIG. 19 is a perspective view of a portion of the FIG. 1 structure illustrating a further operational feature of the invention;

FIG. 21 is a fragmentary cross-sectional view of a hinge section of the utility/camper shell adjacent the truck cab;

FIGS. 24-32 are fragmentary perspective views of various optional features which may be incorporated in the FIG. 4 structure.

BEST MODE OF CARRYING OUT THE INVENTION

Figure 1:
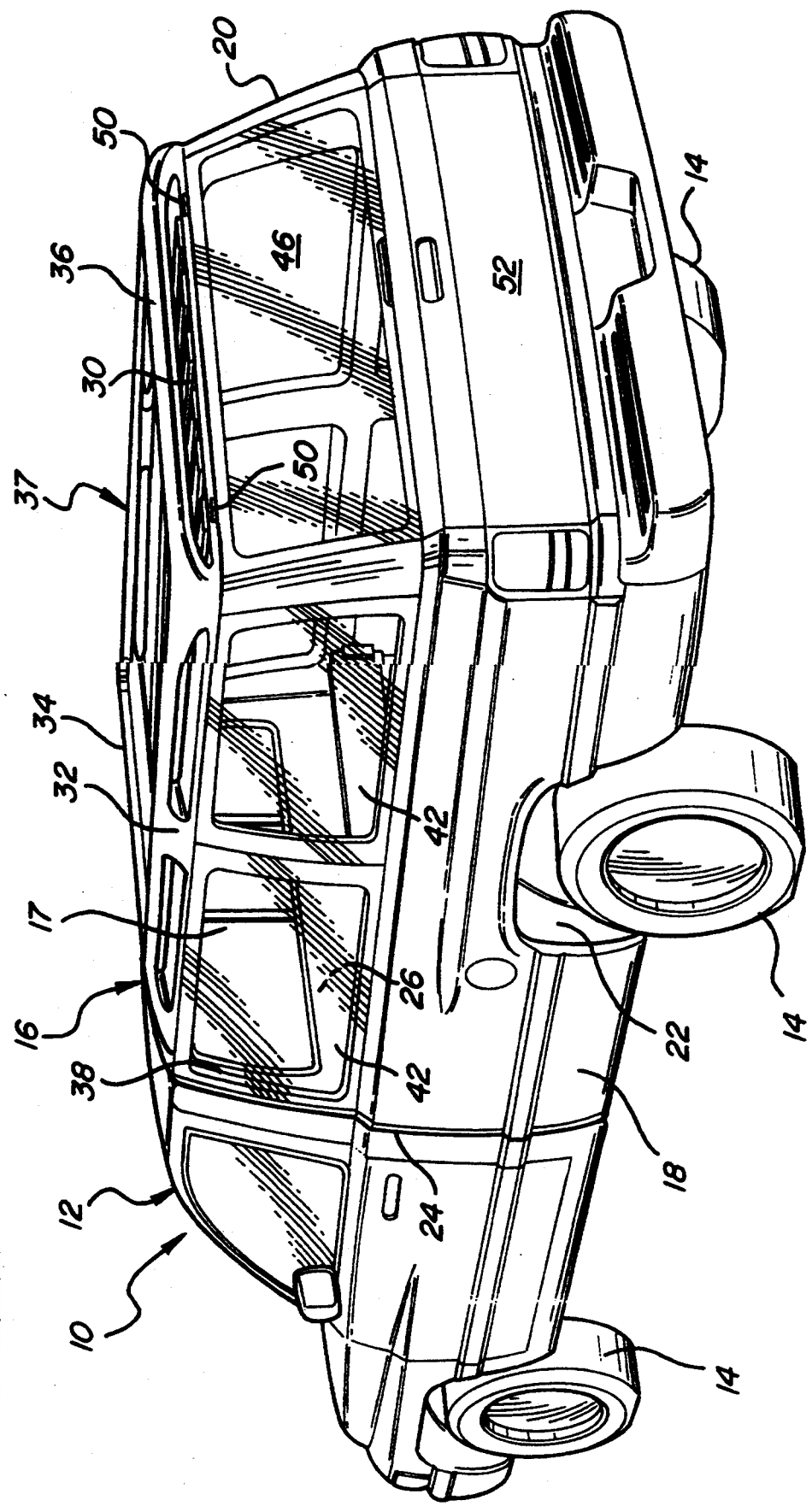
FIG. 1 is a perspective view of a pick-up truck embodying the integrated utility/camper shell invention.
Figure 2:
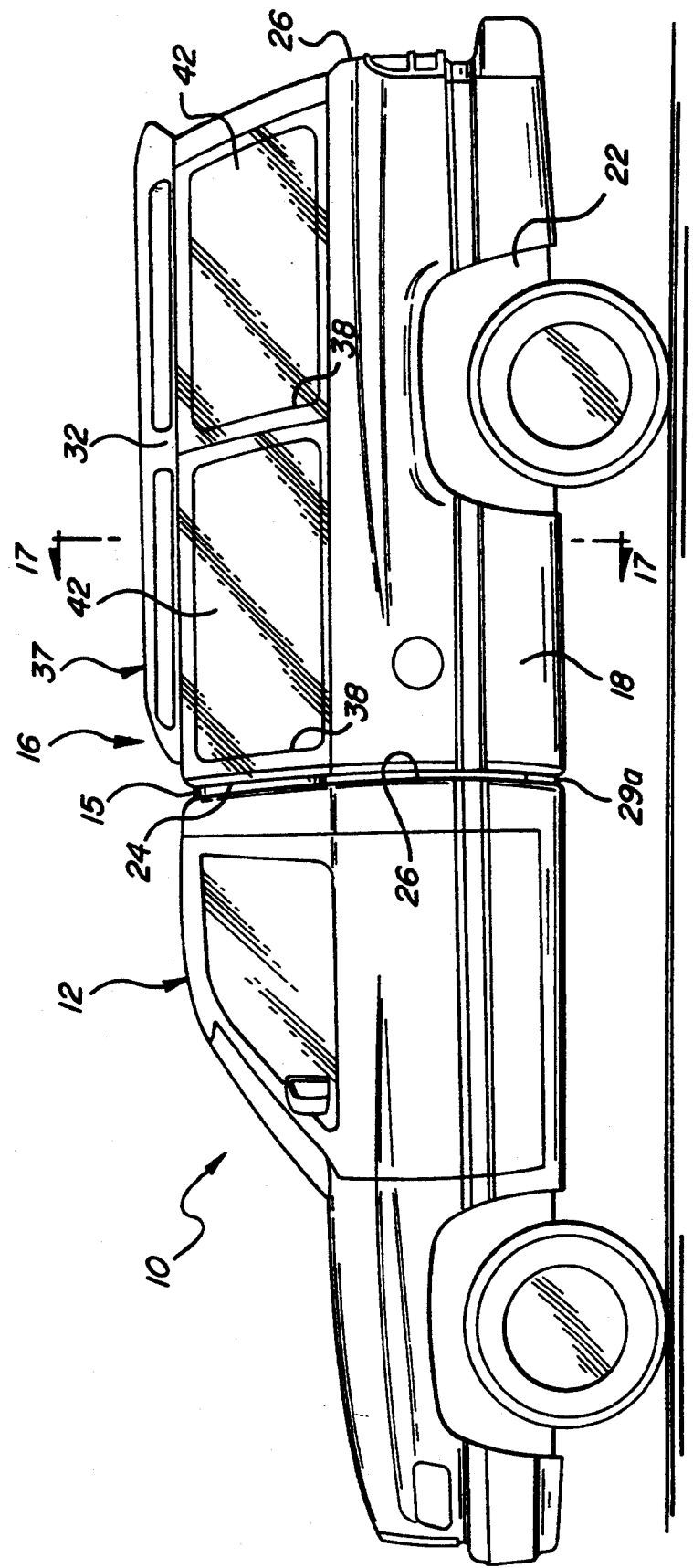
FIG. 2 is a side elevational view of the FIG. 1 structure.
Figure 3:
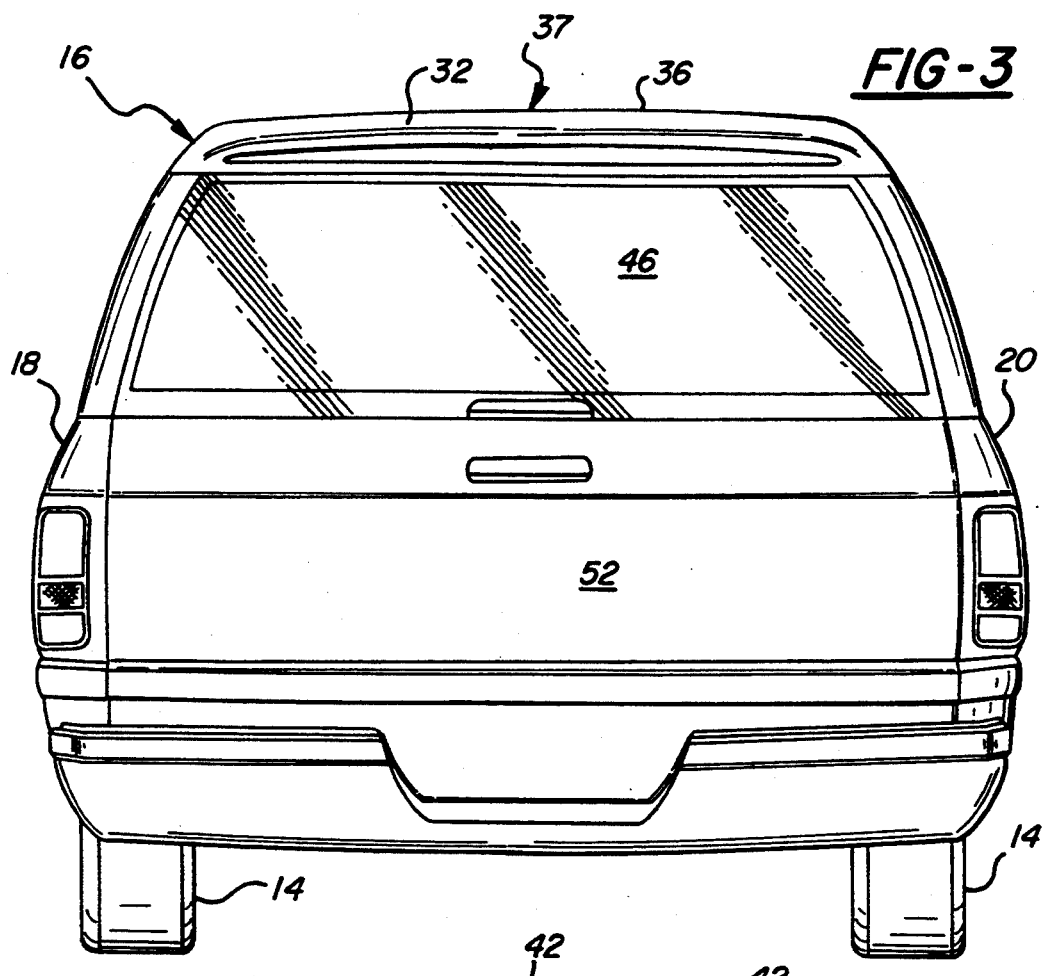
FIG. 3 is an end view of the FIG. 1 structure.

Referring now to the drawings in greater detail, FIGS. 1–3 illustrate a pick-up-type truck 10 including a cab 12, wheels 14, and a utility/camper shell 16 mounted behind the cab, with a suitable seal 15 (FIGS. 2 and 15) secured around the periphery of the window 17 (FIGS. 1 and 15) of the cab.

Figure 14:
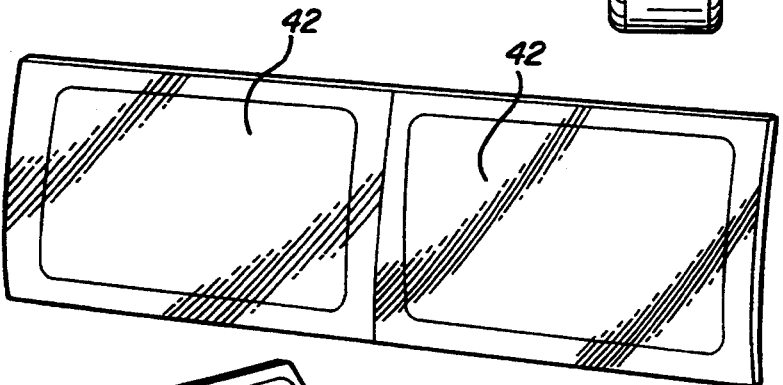
Figure 16:
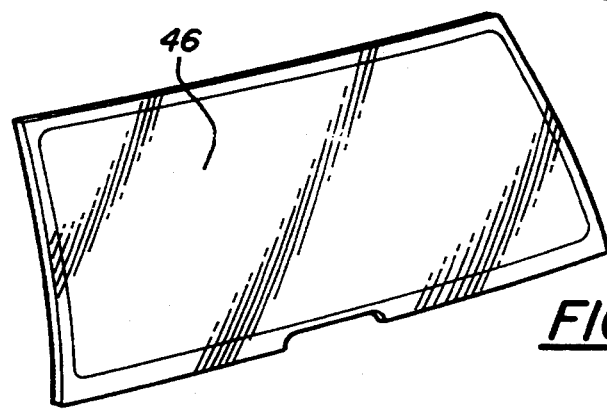
Figure 4:
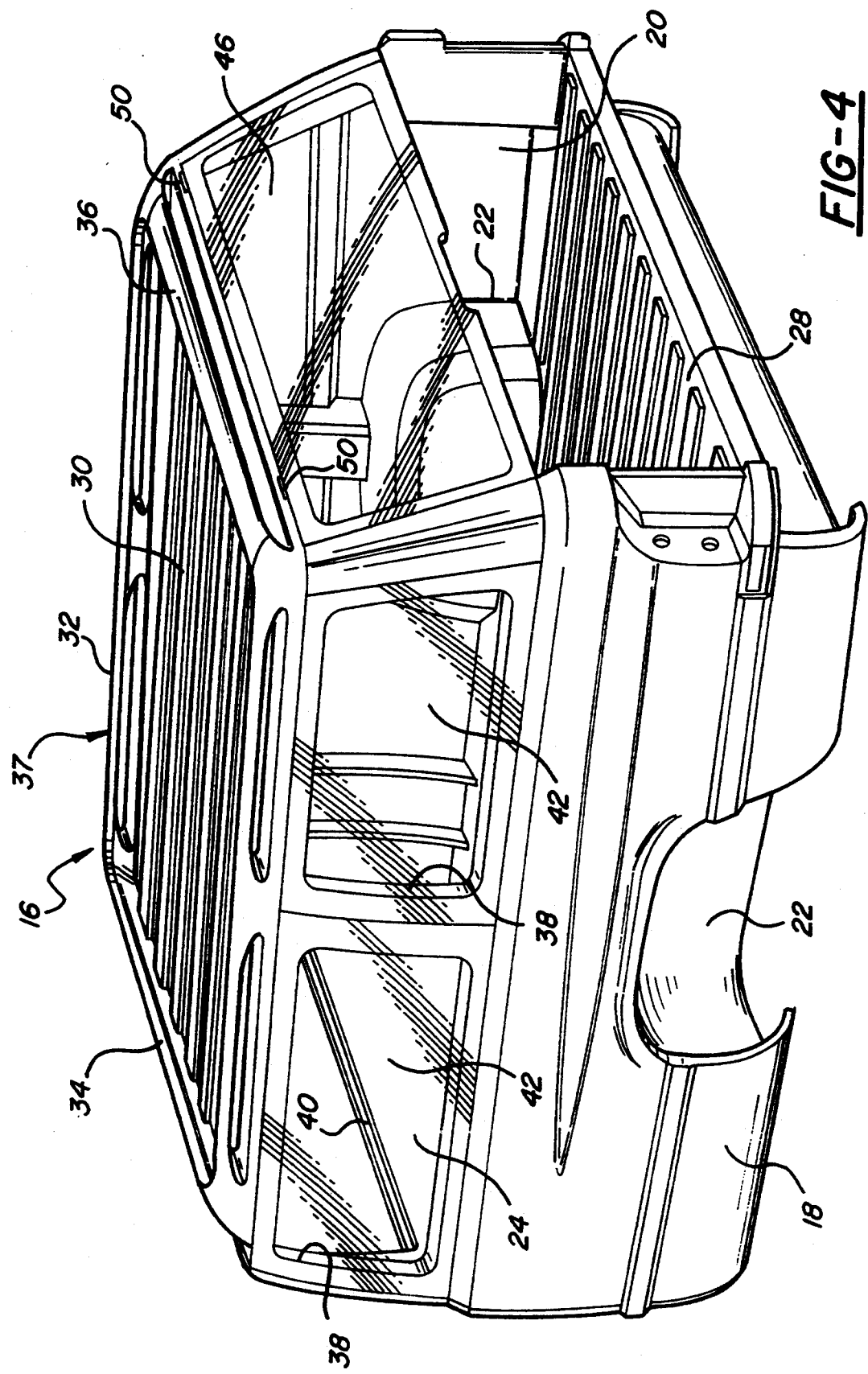
FIG. 4 is a perspective view of the body components of the camper shell.
Figure 6:
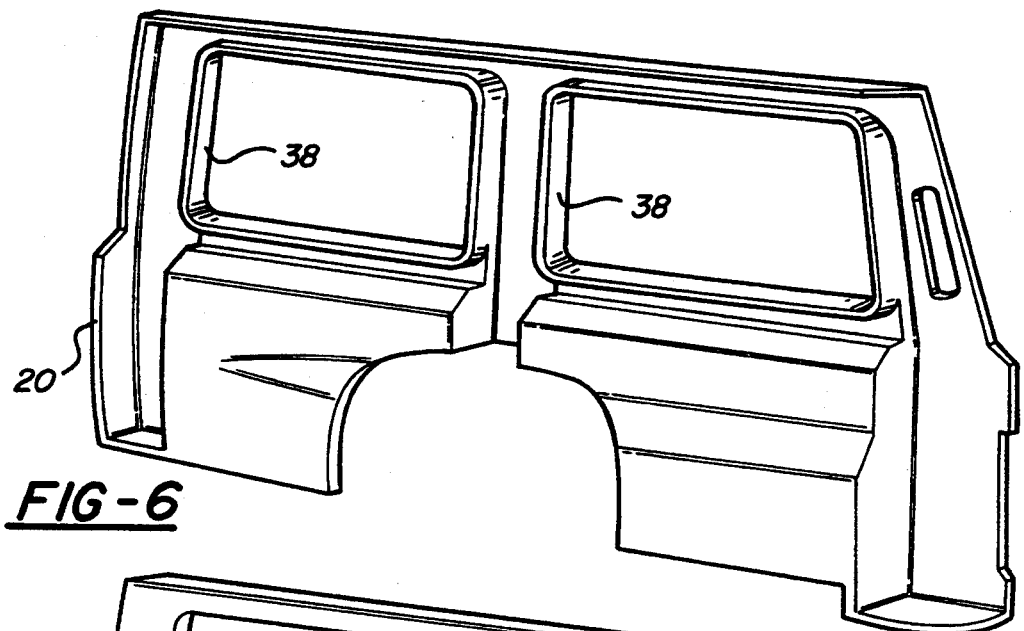
Figure 5:
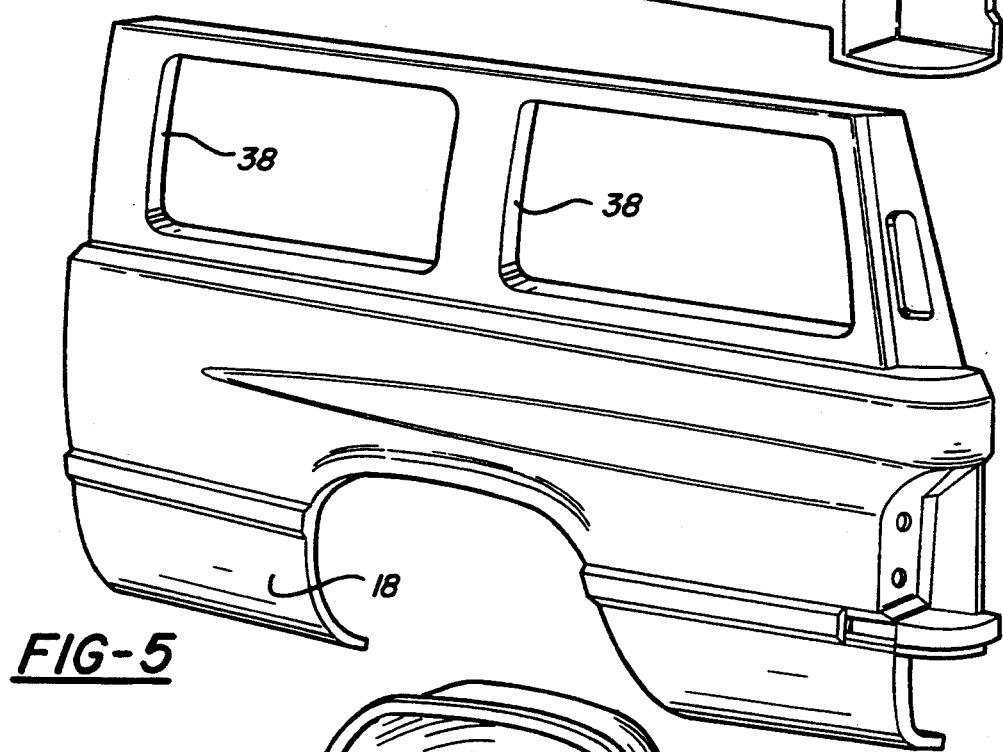
Figure 7:
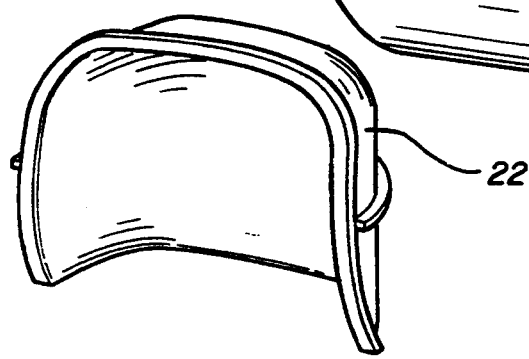

As shown in FIGS. 4–16, the utility/camper shell 16 includes oppositely disposed outer (FIG. 5) and inner (FIG. 6) side walls 18 and 20, respectively, in lieu of the usual side walls of a truck bed; right and left wheel wells 22 (FIG. 7); and a front wall 24 (FIG. 8) mounted adjacent the rear wall 26 (FIG. 2) of the cab 12; all of which are bonded to each other and to a floor 28 (FIG. 9). The floor 28 is adaptable, by virtue of cross braces 29 secured on the underside thereof, to being secured in a suitable manner to the truck frame represented as 29a in FIGS. 2 and 17. A ribbed roof 30 (FIG. 10) is mounted in a four-sided carrier frame 32 (FIG. 11), with front (FIG. 12) and rear (FIG. 13) braces 34 and 36 therefor, forming a roof structure 37. The structure 37 is mounted on the upper edges of the outer side walls 18 and 20 and the front wall 24 (FIGS. 1 and 4). Leading and trailing side window openings 38 (FIG. 5) are formed in each outer and inner side walls 18 and 20, and a window opening 40 (FIG. 8) is formed in the front wall 24. Acrylic covers 42 (FIG. 14) are mounted across the side window openings 38, as shown in FIG. 4.

Figure 17:
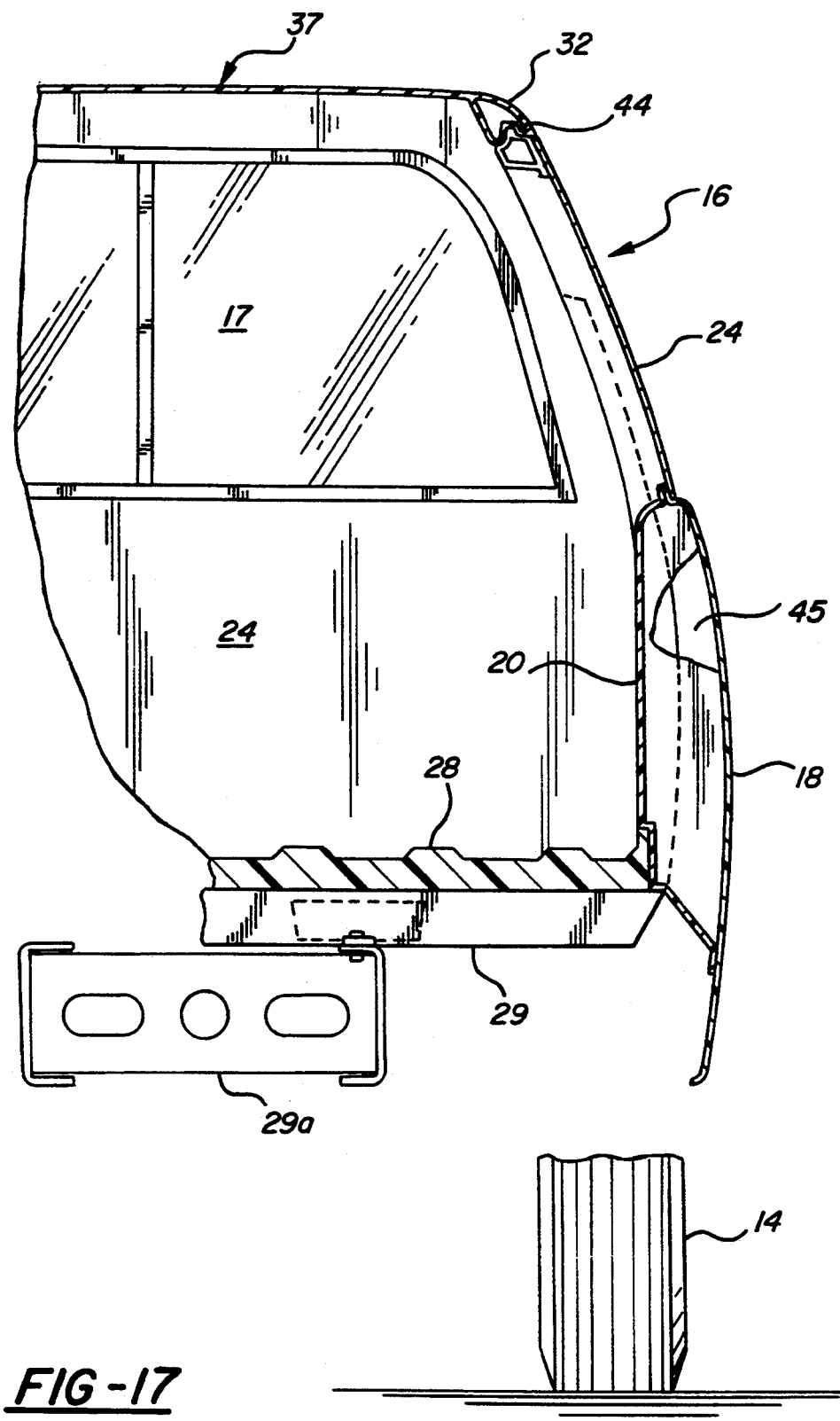
FIG. 17 is a cross-sectional view taken along the plane of the line 17—17 of FIG. 2, and looking in the direction of the arrows.

As shown in FIG. 17, a suitable rubber seal 44 is secured around the periphery of the upper edges of the outer side walls 18 and the front wall 24 to seal off the roof 30 when closed. As further shown in FIG. 7, a space 45 exists between the outer and inner walls 18 and 20.

A lift gate rear window 46 (FIG. 16) is pivotally connected at its upper edge to the trailing edge of the roof carrier frame 32, as shown in FIG. 18. Suitable struts or cylinders 48 may be used to open and then hold the lift gate rear window 46. The struts 48 are detachable at their lower ends 49 (FIG. 18). The window 46 itself is detachable from the rear brace 36 by a pair of separable hinges 50.

As shown in FIG. 19, the two oppositely disposed forward acrylic covers 42 are adaptable to being opened outwardly and upwardly about their upper edges via a pair of suitable struts or cylinders 51 operatively connected between oppositely disposed corner portions thereof and the sides of the window openings 38.

As shown in FIGS. 1 and 18, a tail gate 52 is pivotally connected at its bottom edge to the rear edge of the floor 28 in the usual pick-up truck manner, with the lift gate window 46 operatively connected to the upper edge thereof when both are closed. The tail gate 52 is held in its open position by typical oppositely disposed straps 53.

As may be realized from reviewing FIG. 18, there are two operational modes available concerning the roof members 30, 32, 34 and 36, and the lift gate rear window 46 of the utility/camper shell 16. As desired, the lift gate rear window 46 alone may be pivoted by the struts 48 outwardly and upwardly about the trailing edge of the roof carrier frame 32, as indicated above, or, alternately, the entire roof structure members 30, 32, 34 and 36 and lift gate rear window 46 may be pivoted by suitable oppositely disposed struts or cylinders 54 upwardly about the upper edge of the front section 22, as will be explained. The struts 54 are detachable at their lower ends 55 (FIG. 18) for a purpose to be described. While in its closed position, the roof assembly is prevented from bouncing by virtue of suitable interconnecting latching members, represented as 56a and 56b in FIG. 18, on each rear corner of the respective inner wall 20 and roof 30.

Figure 20:
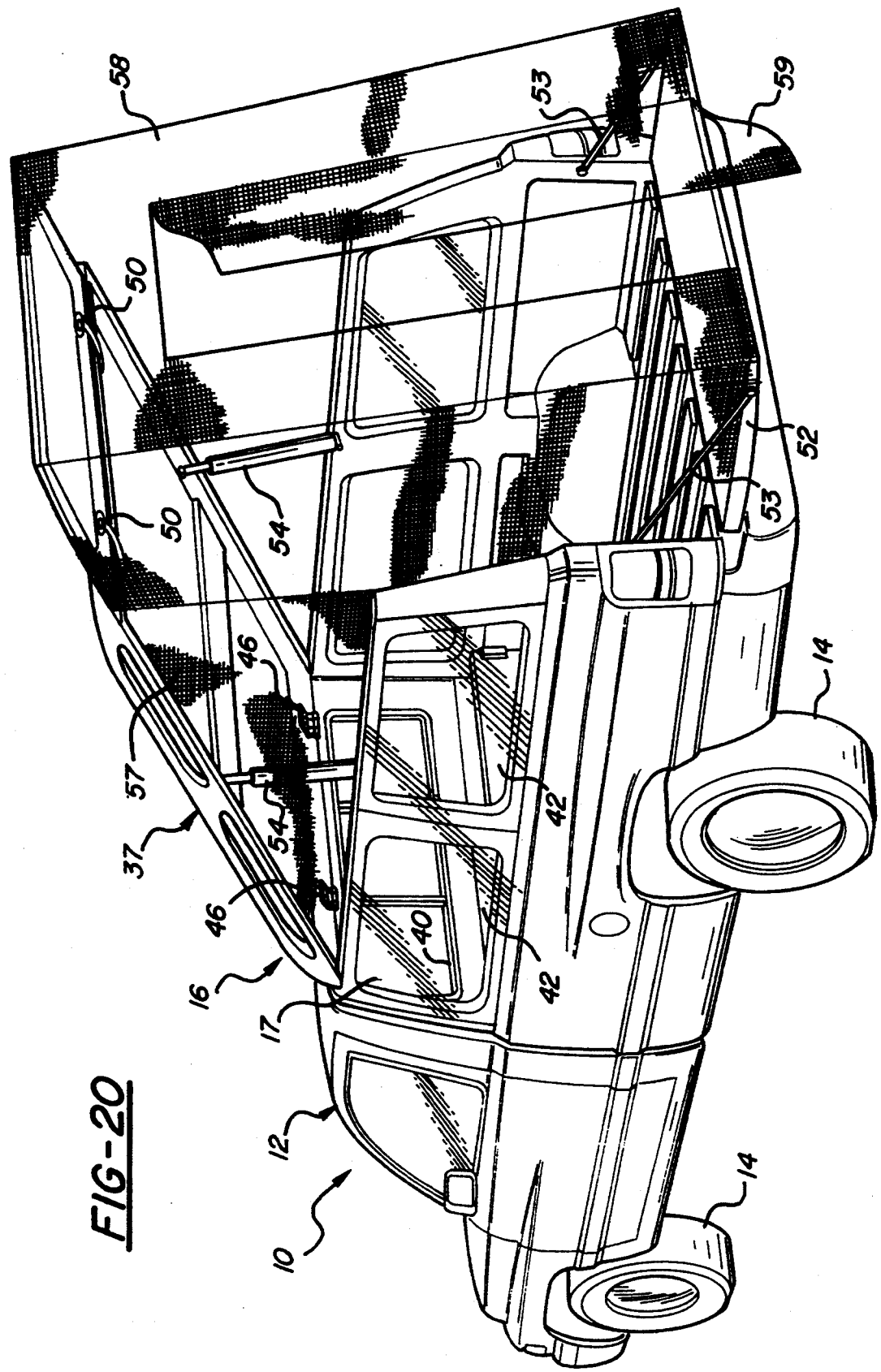
FIG. 20 is a perspective view similar to FIG. 18 illustrating still another operational feature of the invention.

Once in the raised condition, a camper enclosure option illustrated in FIG. 20 is available. In this mode, suitable screening or tent-like material 57 may be secured to all the exposed edges of the utility/camper shell 16 and the tail gate 52. The resultant rear wall 58 of the material 57 may include a door or entry opening 59.

Figure 23:
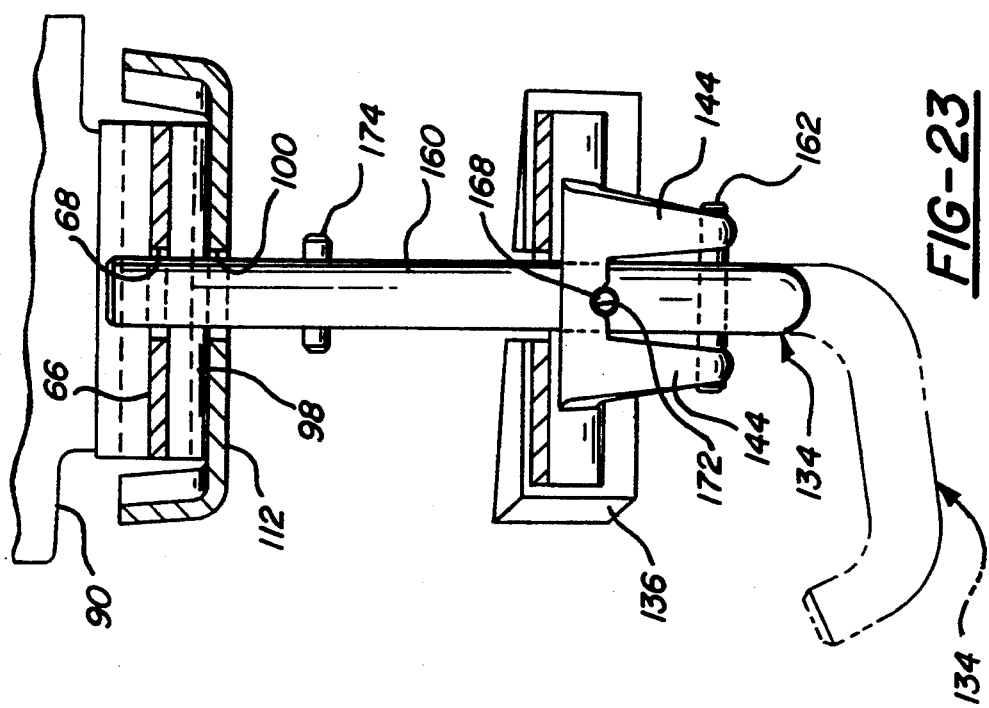
FIG. 23 is an end view taken along the plane of the line 23—23 of FIG. 21, and looking in the direction of the arrows.
Figure 22:
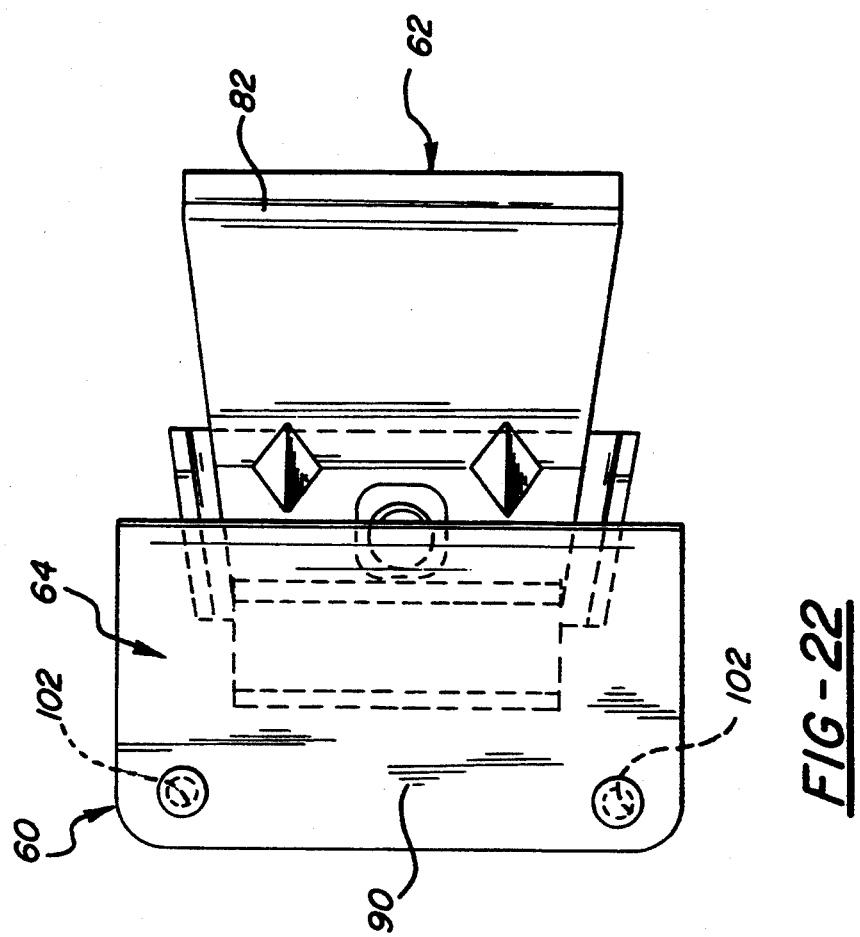
FIG. 22 is a top view taken along the plane of the line 22—22 of FIG. 21, and looking in the direction of the arrows.

Referring now to FIGS. 21–23, each of two spaced-apart (FIG. 18) hinge assemblies 60 serve to operatively interconnect the roof frame 32 and the front wall 24. Each assembly 60 includes a hinge strap 62 and a cooperating receiver bracket 64.

The hinge strap 62 is formed to include a flat body portion 66 having a central opening 68 formed therethrough, a circular portion 70 on the leading end thereof, a first bend 72 to an upwardly tapered surface 74 formed on the trailing end thereof, a second bend 76 to a flat portion 78 parallel to the flat body portion 66, a third bend 80 to a downwardly extending portion 82 having two spaced-apart mounting holes 84 formed therethrough, and a fourth bend 86 to a tapered end portion 88.

The receiver bracket 64 is formed to include a flat top portion 90, a first 180° bend 92 on the trailing end thereof to a forwardly extending portion 94 substantially parallel to the top flat portion 90, a second larger 180° bend 96 to a rearwardly extending portion 98 having a central opening 100. Two spaced-apart mounting holes 102 are formed in the flat top portion 90.

At assembly, the circular portion 70 of the hinge strap 62 is mounted between the portions 94 and 98 of the receiver bracket 64, against the 180° bend 96, with the respective central openings 68 and 100 in alignment.

A first pair of fasteners 104 extend through the mounting holes 102 of the receiver bracket 64 to secure the latter to a flat segment 106 of the trailing end 108 of the front wall 24. A downwardly extending segment 110 and then a reinforced rearwardly extending segment 112 extend from the flat segment 106. The lower half of the bend 96 and the portion 98 of the bracket 64 respectively abut against the segments 110 and 112. An opening 114 is formed through the segment 112 in alignment with the openings 68 and 100. A steel reinforcing member 116 is secured by the fasteners 104 beneath the segments 106, 110 and 112.

The flat portion 78 and the downwardly extending portion 82 of the hinge strap 62 respectively abut against a forwardly extending portion 118 and a downwardly extending portion 120 of an inner roof segment 122. A second pair of fasteners 124 extend through the mounting holes 84 of the hinge strap 62 to secure the latter to the portion 120, along with the hinge strap portions 78 and 82 being bonded to the respective inner wall portions 118 and 120. The inner roof segment 122 further includes in series a downwardly tapered portion 126 extending from the portion 120, an upwardly extending portion 128 and a rearwardly extending portion 130. The latter portion 130, as well as the flat portion 78 of the hinge strap 62, are bonded to inner surfaces of the outer roof 30. A suitable seal 132 is bonded to the inner surface of the portion 118.

A handle assembly 134 includes a housing 136 having a central opening 138 therethrough, oppositely disposed mounting flanges 140 having respective holes 142 therethrough, and legs 144 (FIG. 23) on opposite sides of the opening 138. Suitable fasteners 146 extend through the holes 142 to secure the housing 136 to respective inner roof segments 148 and 150. The segment 148 extends forward to be bonded at a leading arcuate-shaped end 152 with an edge portion 153 of the leading end 108 of the roof frame 32. The segment 150 extends rearwardly and upwardly to cooperate at an upper U-shaped end portion 154 with the trailing upturned edge 155 of the rearwardly extending segment 112 of the leading end 108 of the roof frame 32.

An L-shaped rod-like handle 156 includes a lower bent end gripping portion 158 and a vertical portion 160 extending upwardly through the aligned openings 138, 114, 100 and 68 in the respective housing 136, segment 112, portion 98, and body portion 66. It is to be noted that the opening 68 is large enough to provide sufficient clearance for the body portion 66 to clear the end portion of the vertical rod portion 160, when the roof is pivoted as will be explained.

A first pin 162 extends laterally through an opening 164 through the vertical handle portion 160, such that it fits in recesses 166 formed in the bottom edges of the housing 136 legs 144. A second pin 168 extends forwardly through an opening 170 through the vertical handle portion 160, such that it fits in a recess 172 (FIG. 23) between the legs 144. A third pin 174 extends laterally through an opening 176 through the vertical handle portion 160 just below the segment 112 of the roof frame 32 leading end 108. A compression coil spring 178 is mounted around the vertical handle portion 160 between the third pin 174 and the upper surface of the housing 136, urging the pins 162 and 168 against the respective recesses 166 and 172.

In operation, when the gripping portion 158 of the handle 156 is manually pulled downwardly, the pins 162, 168 and 174 are likewise pulled downwardly until the spring 178 is fully compressed. At this point the handle is rotated 90° to seat the second pin 158 in the lower recesses 166. This action pulls the upper end portion of the vertical handle portion 160 out of the opening 68, such that the roof assembly consisting of the roof members 30, 32, 34 and 36 may be manually pulled rearwardly, pulling the circular end portion 70 of the hinge strap 62 out of the 180° bend 96 of the receiver bracket 64. The two pairs of struts 48 and 54 are released at their respective lower ends 49 and 55. The roof assembly is now free to be manually lifted off of the side walls 18 and 20, and the front wall 24, facilitating the loading of any tall items, for example, into the now open shell. Prior to lifting off the roof assembly, the lift gate rear window 46 may be removed by releasing the separable hinges 49.

With the exception of the two hinge straps 62, receiver brackets 64, L-shaped handles 156, and tail gate 52, all of which are steel materials, the remaining parts are all lightweight fiber reinforced plastic (FRP) materials, such as the following:

Front wall 24: Resin Transfer Molding (RTM), Reaction Injection Molding (RIM), Liquid Composite Molding (LCM);

Floor 28, outer and inner side walls 18 and 20, and wheel wells 22: Sheet Molding Compound;

Acrylic: side window members 42, and lift gate rear window 46.

The outer walls 18 and front wall 24 with a curable abrasion resistant exterior surface coating.

As additional optional features, reference to FIG. 24 illustrates that the utility/camper shell 16 interior may include side storage bins 180 and/or floor storage bins 182. The side storage bins 180 may be covered with a netting 184 secured in any suitable manner, such as by Velcro or suitable hook and loop fastener strips 186. As shown in FIG. 25, folding seat or table units 188, including cup holders 190, may be added adjacent the side storage bins 180.

As shown in FIG. 26, in lieu of the separate side and floor storage bins 180 and 182, combination wall and floor storage bins 192 may be incorporated in the shell, with Velcro pads 194 on the side wall thereof, for carrying and holding a cooler, for example, or the storage bin 192 may be covered with a removable hinged lid 196.

A further storage bin 198 option is shown in FIG. 27 as mounted on the inner surface of the front wall 24, complete with oppositely disposed speakers 200. Still another alternate storage arrangement is shown in FIG. 28 as including panels 202 and 204 slidably mounted in respective brackets 206 and 208/210.

FIG. 29 illustrates an ingress assist handle 212 secured on the inner, upper portion of the inner wall 30, and one type of ingress step 214 including a hinge 216 secured to a bumper 218, which permits the step 214 to be folded down into a use position, as shown in FIG. 30. An alternate pull-out type ingress step 220 is shown in FIGS. 31 and 32, slidably mounted in a suitable slot 222 formed in the bumper 218.

Industrial Applicability

It should be apparent that the inventive utility/camper shell is stylized, lightweight, practical for both camping and carrying cargo, and readily adaptable for use on a standard pick-up truck frame.

While but one general embodiment of the invention has been shown and described, other modifications thereof are possible within the scope of the following claims.

What is claimed is:

1. A utility/camper shell for use on a truck frame supporting a front cab, said utility/camper shell comprising oppositely disposed outer and inner side walls, oppositely disposed wheel wells, and a front wall bonded together with the bottom portions of each of said front wall, said inner side walls, and said wheel wells being bonded to respective front and side edges of a floor, said floor including a plurality of transverse braces positionable on top of the frame, a roof, and a hinge sub-assembly for pivotally and releasably connecting said roof at the leading edge thereof to the upper edge of said front wall, wherein said transverse braces include extended portions, each of which spreads in a stepped configuration beyond one of the oppositely disposed sides of said floor, and said inner side walls are each formed to include a pair of shoulders which seat directly on uppermost surfaces of each of said floor and said extended portion and each said inner side wall, between said shoulders, abuts flush against a respective said side edge of said floor to be bonded thereto.

2. A utility/camper shell for use on a truck frame supporting a front cab, said utility/camper shell comprising oppositely disposed outer and inner side walls, oppositely disposed wheel wells, and a front wall secured together and to a floor, said floor secured to the frame, a roof, and a hinge sub-assembly for pivotally and releasably connecting said roof at the leading edge thereof to the upper edge of said front wall, wherein said hinge sub-assembly includes a hinge strap secured to said roof, a receiver bracket secured to said front wall and operatively connected to said hinge strap, adapted to permit said roof to be pivoted upwardly about said hinge subassembly, and a spring-loaded handle releasably connected to said hinge strap and said receiver bracket, said spring-loaded handle being adapted to manually release said hinge strap from said receiver bracket to thereby permit said roof to be manually removed from and reinstalled adjacent and above said front and side walls, wherein said receiver bracket includes a first flat portion secured at the forward end thereof to said front wall, a further flat portion mounted on a portion of said front wall, a pair of 180° bends interconnecting said first and further flat portions, and aligned openings formed through said portion of said front wall and through said further flat portion.

3. The utility/camper shell described in claim 2, and an acrylic sheet pivotally connected at the upper edge thereof to the trailing edge of said roof, said acrylic sheet serving as a lift gate rear window.

4. The utility/camper shell described in claim 2, and side-by-side paired window openings formed in each outer and inner side walls, and an acrylic cover mounted over each of the paired window openings, serving as a window.

5. The utility/camper shell described in claim 2, wherein said hinge strap includes a flat portion, an opening formed through said flat portion, a circular portion formed on the forward edge of said flat portion and adapted to being pivotally mounted in one of said 180° bends of said receiver bracket, and a substantially inverted U-shaped portion extending from the rear edge of said flat portion and secured to said roof.

6. The utility/camper shell described in claim 5, and an inner segment formed in said front wall, a handle support member mounted through said inner segment, an opening formed through said support member, wherein said spring-loaded handle includes a rod adapted to extend upwardly in seriatim through said openings formed in said handle support member, said portion of said front wall, said further flat portion of said receiver bracket, and said flat portion of said hinge strap, a first pin mounted through said rod adapted to abut against the bottom surface of said handle support member, a second pin mounted through said rod adjacent said portion of said front wall, a coil spring mounted around said rod between said second pin and the upper surface of said handle support member for urging said rod upwardly through said opening and said first pin against said bottom surface of said handle support member, and a laterally extending grippable handle formed on the lower end of said rod for manually pulling said rod out of said opening in said hinge strap to thus permit the roof to be manually removed from the front and side walls, and later reinstalled in the reverse sequence.

* * * * *